United States Patent
Lee et al.

(10) Patent No.: US 10,091,707 B2
(45) Date of Patent: Oct. 2, 2018

(54) METHOD AND APPARATUS FOR INDICATING D2D RELATED INFORMATION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/116,151

(22) PCT Filed: Mar. 23, 2015

(86) PCT No.: PCT/KR2015/002787
§ 371 (c)(1),
(2) Date: Aug. 2, 2016

(87) PCT Pub. No.: WO2015/142132
PCT Pub. Date: Sep. 24, 2015

(65) Prior Publication Data
US 2017/0181064 A1   Jun. 22, 2017

Related U.S. Application Data

(60) Provisional application No. 61/968,994, filed on Mar. 21, 2014.

(51) Int. Cl.
| H04W 48/12 | (2009.01) |
| H04W 76/14 | (2018.01) |
| H04W 76/02 | (2009.01) |
| H04L 29/08 | (2006.01) |
| H04W 8/00  | (2009.01) |

(Continued)

(52) U.S. Cl.
CPC ....... *H04W 48/12* (2013.01); *H04L 29/08396* (2013.01); *H04L 67/16* (2013.01); *H04L 67/322* (2013.01); *H04L 67/325* (2013.01); *H04W 8/005* (2013.01); *H04W 28/0268* (2013.01); *H04W 48/06* (2013.01); *H04W 48/16* (2013.01); *H04W 76/023* (2013.01); *H04W 76/14* (2018.02); *H04W 84/18* (2013.01); *H04W 48/02* (2013.01)

(58) Field of Classification Search
CPC ..... H04W 48/12; H04W 48/16; H04W 84/18; H04W 8/005; H04W 76/023; H04W 28/0268; H04W 48/06; H04L 29/08396
See application file for complete search history.

(56) References Cited

U.S. PATENT DOCUMENTS

| 2013/0324114 A1 | 12/2013 | Raghothaman et al. |
| 2014/0057670 A1 | 2/2014 | Lim et al. |
| 2015/0208452 A1* | 7/2015 | Lee .................. H04W 36/0061 455/426.1 |

FOREIGN PATENT DOCUMENTS

| WO | 2013-177447 A1 | 11/2013 |
| WO | 2013-181515 A1 | 12/2013 |
| WO | 2014-014326 A1 | 1/2014 |

* cited by examiner

*Primary Examiner* — Jackie Zuniga Abad
(74) *Attorney, Agent, or Firm* — Dentons US LLP

(57) ABSTRACT

A method and apparatus for indicating device-to-device (D2D) related information in a wireless communication system is provided. A user equipment (UE) indicates at least one of a service type of a D2D operation, quality of service (QoS) characteristics of the D2D operation or a D2D configuration to a network.

10 Claims, 15 Drawing Sheets

(51) Int. Cl.
*H04W 28/02* (2009.01)
*H04W 48/06* (2009.01)
*H04W 48/16* (2009.01)
*H04W 84/18* (2009.01)
*H04W 48/02* (2009.01)

FIG. 11

| R | R | E | LCID | | | Oct 1 |
|---|---|---|------|---|---|-------|
| F | L | | | | | Oct 2 |
| L | | | | | | Oct 3 |

//<sub>US 10,091,707 B2</sub>

METHOD AND APPARATUS FOR INDICATING D2D RELATED INFORMATION IN WIRELESS COMMUNICATION SYSTEM

This application is a National Phase Application of International Application No. PCT/KR2015/002787, filed on Mar. 23, 2015, which claims the benefit of U.S. Provisional Application No. 61/968,994, filed Mar. 21, 2014, which are hereby incorporated by reference in their entirety for all purposes as if fully set forth herein.

BACKGROUND OF THE INVENTION

Field of the Invention

The present invention relates to wireless communications, and more particularly, to a method and apparatus for indicating device-to-device (D2D) related information in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. For efficient D2D operation, a method for transmitting D2D related information may be required.

SUMMARY OF THE INVENTION

The present invention provides a method and apparatus for indicating device-to-device (D2D) related information in a wireless communication system. The present invention provides a method for indicating at least one of service type/quality of service (QoS) characteristics of D2D service/D2D configuration to a network.

In an aspect, a method for indicating, by a user equipment (UE), device-to-device (D2D) related information in a wireless communication system is provided. The method includes indicating, by the UE, at least one of a service type of a D2D operation, quality of service (QoS) characteristics of the D2D operation or a D2D configuration to a network, and indicating, by the UE, stop of the D2D operation to the network.

In another aspect, a user equipment (UE) is provided. The UE includes a memory, a transceiver, and a processor coupled to the memory and the transceiver, and configured to control the transceiver to indicate at least one of a service type of a device-to-device (D2D) operation, quality of service (QoS) characteristics of the D2D operation or a D2D configuration to a network, and control the transceiver to indicate stop of the D2D operation to the network.

D2D operation can be performed efficiently.

BRIEF DESCRIPTION OF THE DRAWINGS

FIG. 10 to FIG. 12 shows an example of a MAC PDU subheader.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
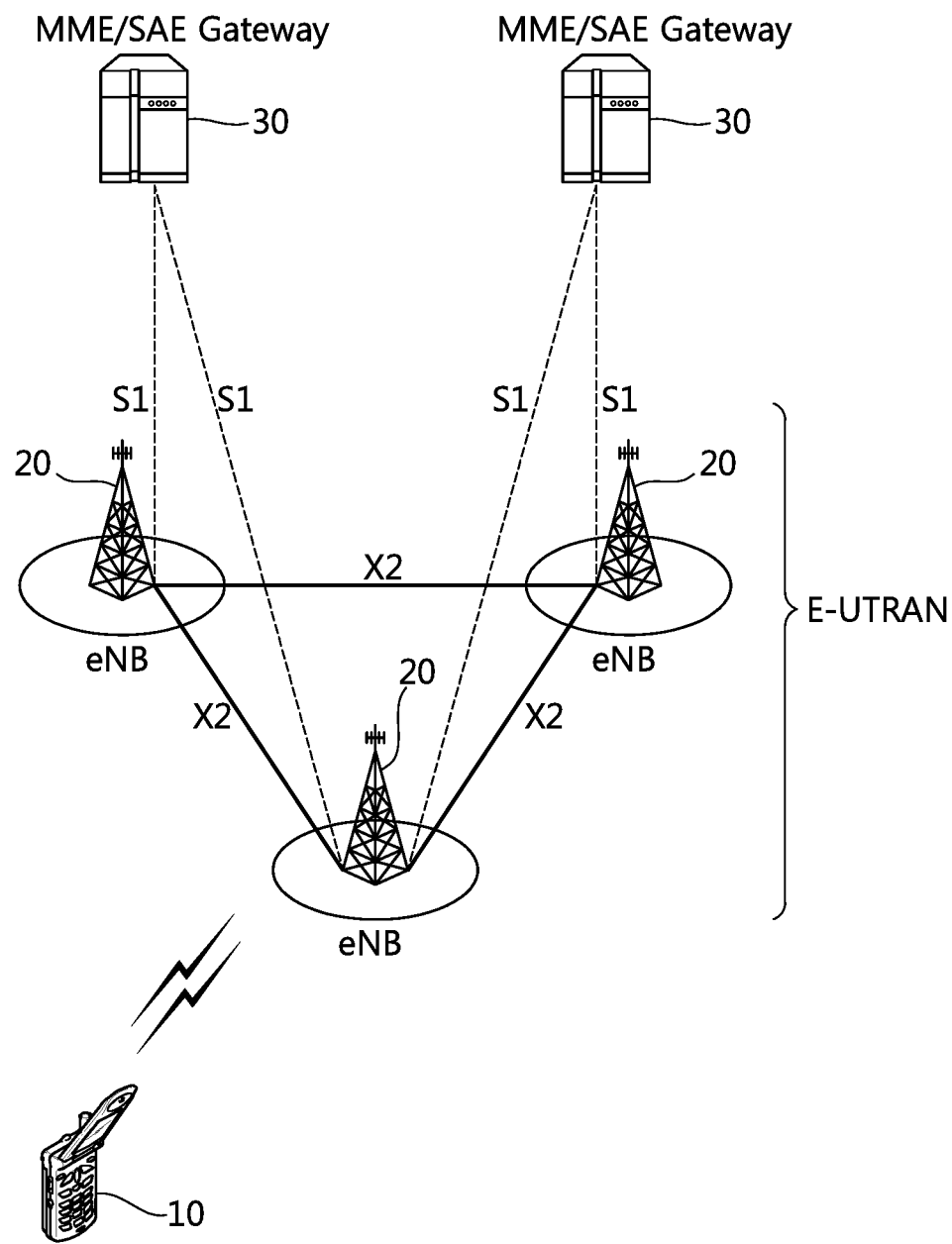
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
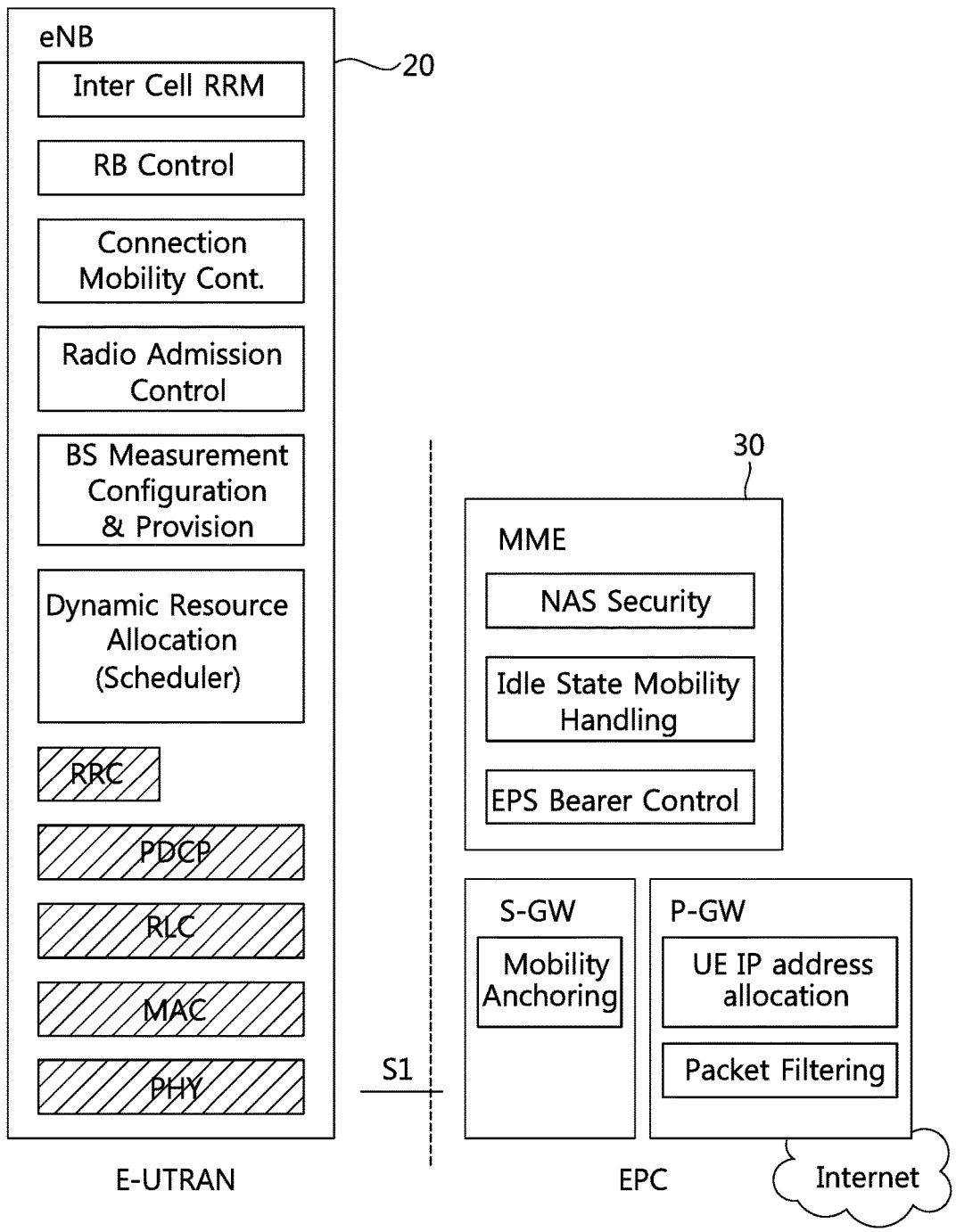
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
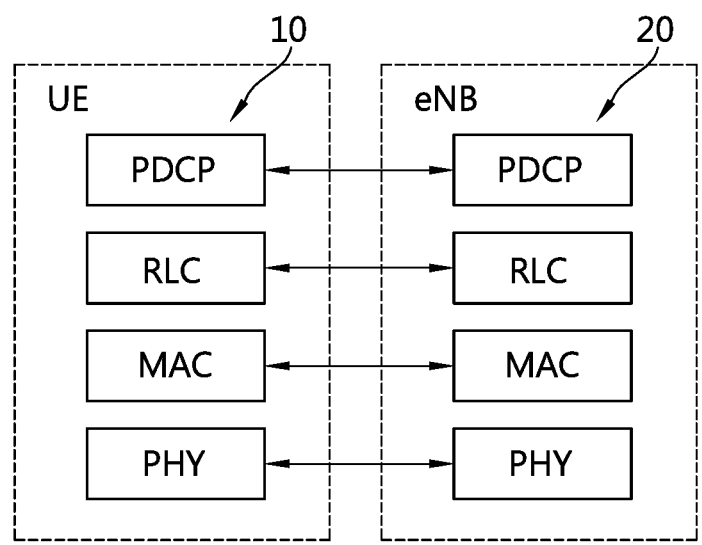
FIG. 3 shows a block diagram of a user plane protocol stack of an LTE system.
Figure 4:
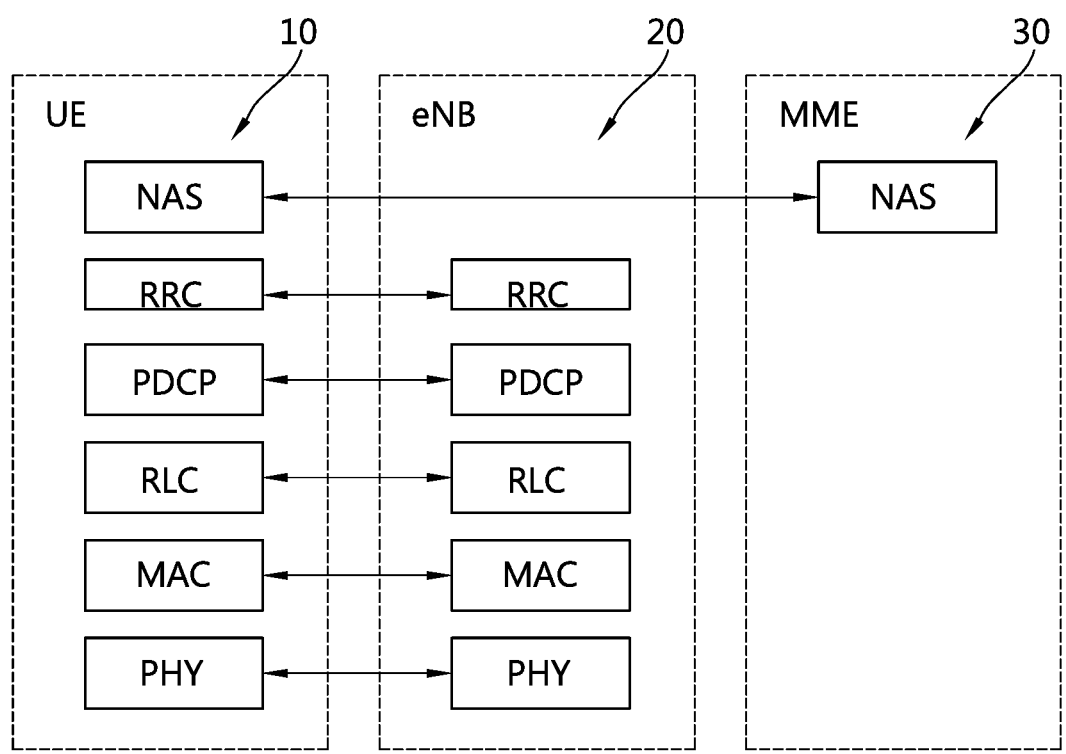
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
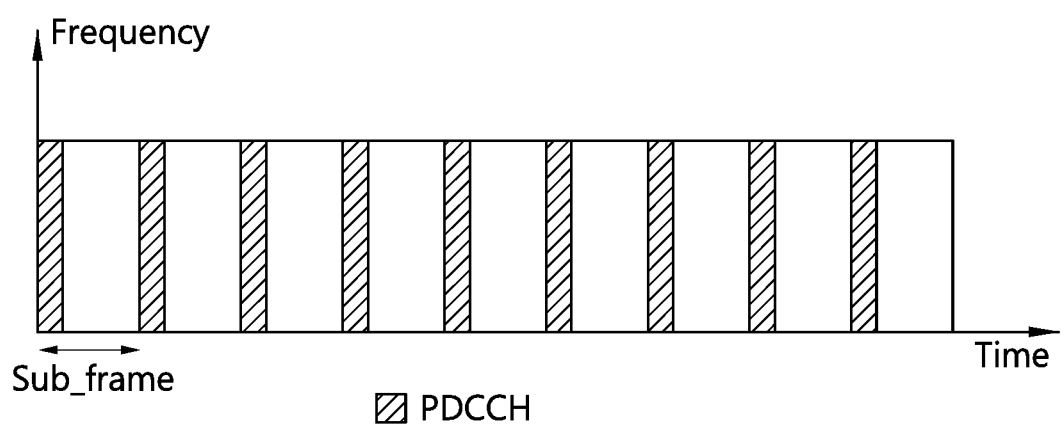
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

Figure 6:
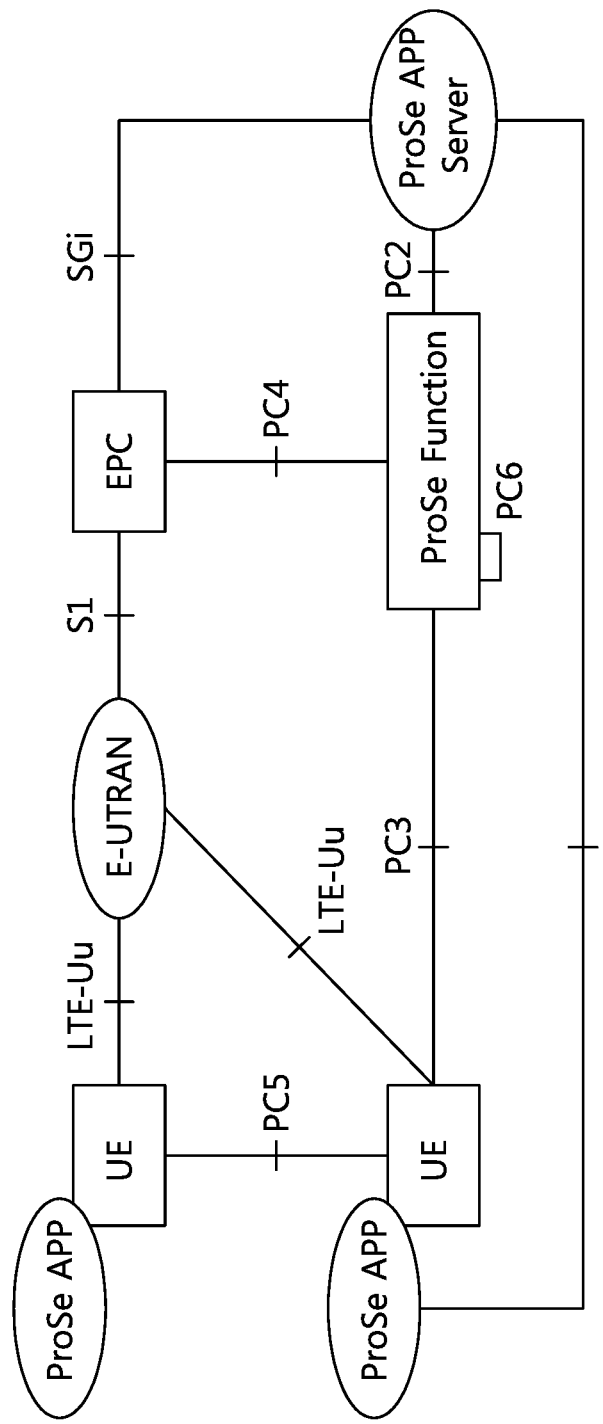
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications
Authorization and configuration of the UE for discovery and direct communication
Enable the functionality of the EPC level ProSe discovery
ProSe related new subscriber data and handling of data storage, and also handling of ProSe identities
Security related functionality
Provide control towards the EPC for policy related functionality
Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signaling requirements.
PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.
PC3: It is the reference point between the UE and ProSe function. It is used to define the interaction between UE and ProSe function. An example may be to use for configuration for ProSe discovery and communication.
PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.
PC5: It is the reference point between UE to UE used for control and user plane for discovery and communication, for relay and one-to-one communication (between UEs directly and between UEs over LTE-Uu).
PC6: This reference point may be used for functions such as ProSe discovery between users subscribed to different PLMNs.
SGi: In addition to the relevant functions via SGi, it may be used for application data and application level control information exchange.
Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 7:
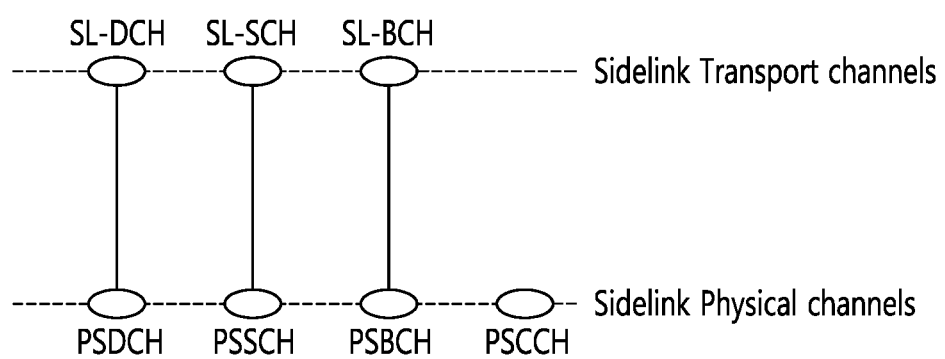
FIG. 7 shows an example of mapping between sidelink transport channels and sidelink physical channels.

FIG. 7 shows an example of mapping between sidelink transport channels and sidelink physical channels. Referring to FIG. 7, a physical sidelink discovery channel (PSDCH), which carries ProSe direct discovery message from the UE, may be mapped to a sidelink discovery channel (SL-DCH). The SL-DCH is characterized by:

fixed size, pre-defined format periodic broadcast transmission;
support for both UE autonomous resource selection and scheduled resource allocation by eNB;
collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:

support for broadcast transmission;
support for both UE autonomous resource selection and scheduled resource allocation by eNB;
collision risk due to support of UE autonomous resource selection; no collision when UE is allocated dedicated resources by the eNB;
support for HARQ combining, but no support for HARQ feedback;
support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

Figure 8:
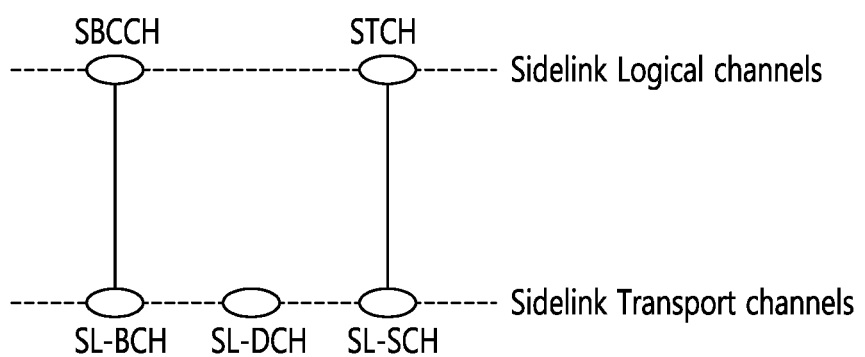
FIG. 8 shows an example of mapping between sidelink logical channels and sidelink transport channels for ProSe direct communication.

FIG. 8 shows an example of mapping between sidelink logical channels and sidelink transport channels for ProSe direct communication. Referring to FIG. 8, the SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

In order to perform synchronization SBCCH carries the most essential system information needed to receive other ProSe channels and signals. SBCCH along with synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise the UE uses pre-configured parameters. There is only one subframe every 40 ms for synchronization signal and SBCCH transmission for in-coverage operation. SIB18 provides the resource information for synchronization signal and SBCCH transmission. There are two pre-configured subframes every 40 ms for out of coverage operation. The UE receives synchronization signal and SBCCH in one subframe and transmit synchronization signal and SBCCH on another subframe if UE becomes synchronization source based on defined criterion.

The UE performs Prose direct communication on subframes defined over the duration of sidelink control period. The sidelink control period is the period over which resources allocated in a cell for sidelink control and sidelink data transmissions occur. Within the sidelink control period the UE sends a sidelink control followed by data. Sidelink control indicates a layer 1 ID and characteristics of the transmissions (e.g. MCS, location of the resource(s) over the duration of sidelink control period, timing alignment).

The UE performs transmission and reception of Uu and PC5 with the following decreasing priority order:
Uu transmission/reception (highest priority);
PC5 ProSe direct communication transmission/reception;
PC5 ProSe direct discovery transmission/reception (lowest priority).

The UE supporting ProSe direct communication can operate in two modes for resource allocation. First is scheduled resource allocation (hereinafter, D2D mode 1), in which the UE needs to be RRC_CONNECTED in order to transmit data, and the UE requests transmission resources from the eNB. The eNB schedules transmission resources for transmission of sidelink control and data. The UE sends a scheduling request (dedicated SR or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured SL-RNTI. Second is UE autonomous resource selection (hereinafter, D2D mode 2), in which the UE on its own selects resources from resource pools to transmit sidelink control and data.

The UE in RRC_CONNECTED may send the ProSe direct indication to the eNB when the UE becomes interested in ProSe direct communication. In response eNB may configure the UE with a SL-RNTI. The UE is considered in-coverage for ProSe direct communication whenever it detects a cell on a public safety ProSe carrier. The following rules apply for the UE:
If the UE is out of coverage, it can only use UE autonomous resource selection;
If the UE is in coverage, it may use scheduled resource allocation or autonomous resource selection as per eNB configuration;
If the UE is in coverage, it shall use only the resource allocation mode indicated by eNB configuration unless one of the exceptional cases occurs. When an exceptional case occurs, the UE is allowed to use UE autonomous resource selection temporarily even though it was configured to use scheduled resource allocation. Resource pool to be used during exceptional case may be provided by the eNB.

The resource pools for sidelink control when the UE is out of coverage are configured as below:
The resource pool used for reception is pre-configured;
The resource pool used for transmission is pre-configured.
The resource pools for sidelink control when the UE is in coverage are configured as below:
The resource pool used for reception is configured by the eNB via RRC, in broadcast signaling;
The resource pool used for transmission is configured by the eNB via RRC, in dedicated or broadcast signalling, if UE autonomous resource selection is used;
The resource pool used for transmission is configured by the eNB via RRC, in dedicated signalling if scheduled resource allocation is used;
The eNB schedules the specific resource(s) for sidelink control transmission within the configured reception pool.

In order to perform communication even when some UEs are in-coverage and some UEs are out of coverage, all UEs (i.e. both in and out of coverage) should be configured with resource pools for sidelink control which is the union of the resource pools used for transmission of sidelink control in neighbor cells and transmission of sidelink control resource pool out of coverage.

The resource pools for data when the UE is out of coverage are configured as below:
The resource pool used for reception is pre-configured;
The resource pool used for transmission is pre-configured.
The resource pools for data when the UE is in coverage are configured as below:
The resource pools used for transmission and reception are configured by the eNB via RRC, in dedicated or broadcast signalling, if UE autonomous resource selection is used;
There is no resource pool for transmission if scheduled resource allocation is used.

Figure 9:
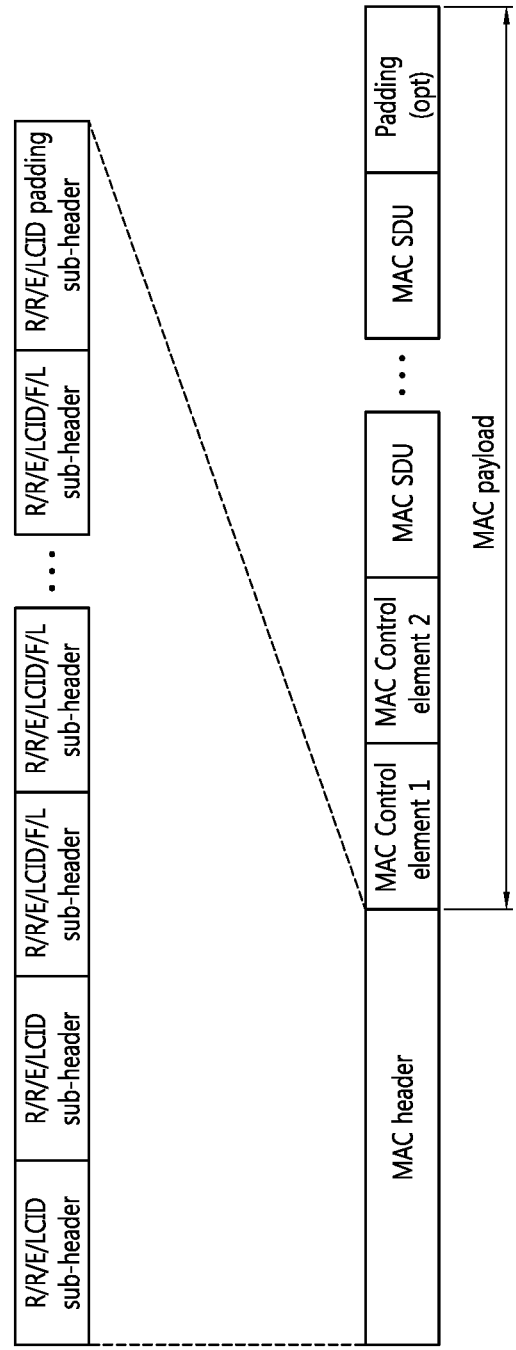
FIG. 9 shows an example of a MAC PDU.

FIG. 9 shows an example of a MAC PDU. A MAC PDU consists of a MAC header, zero or more MAC CEs, zero or more MAC service data units (SDUs), and optionally padding. Both the MAC header and the MAC SDUs are of variable sizes.

Figure 10:
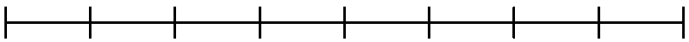
Figure 11:
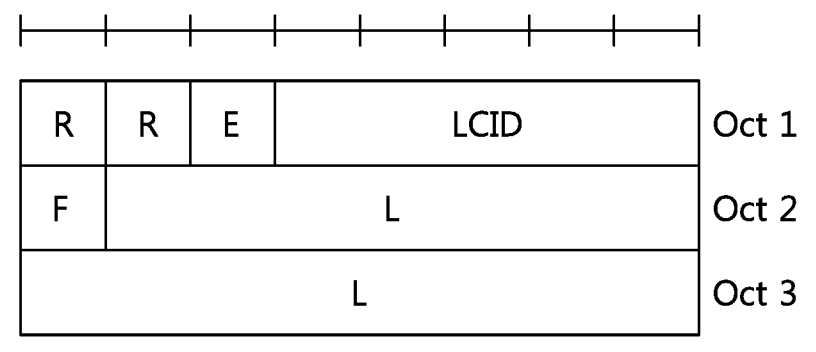
Figure 12:
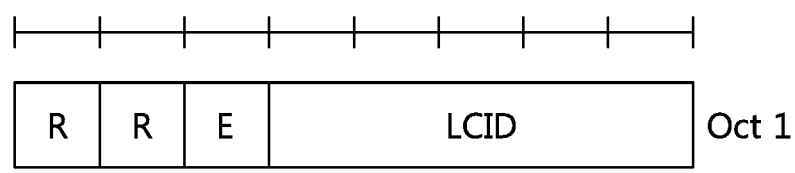

FIG. 10 to FIG. 12 shows an example of a MAC PDU subheader. A MAC PDU header consists of one or more MAC PDU subheaders. Each subheader corresponds to either a MAC SDU, a MAC CE or padding. A MAC PDU subheader consists of the six header fields R/R/E/LCID/F/L but for the last subheader in the MAC PDU and for fixed sized MAC CEs. FIG. 10 shows R/R/E/LCID/F/L MAC PDU subheader with 7-bits L field. FIG. 11 shows R/R/E/LCID/F/L MAC PDU subheader with 15-bits L field. The last subheader in the MAC PDU and subheaders for fixed sized MAC CEs consist solely of the four header fields R/R/E/LCID. A MAC PDU subheader corresponding to padding consists of the four header fields R/R/E/LCID. FIG. 12 shows R/R/E/LCID MAC PDU subheader. MAC PDU subheaders have the same order as the corresponding MAC SDUs, MAC CEs and padding.

MAC CEs are always placed before any MAC SDU. Padding occurs at the end of the MAC PDU, except when single-byte or two-byte padding is required. Padding may have any value and the UE shall ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per UE. A maximum of one MCH MAC PDU can be transmitted per TTI.

The UE performing D2D transmission/reception in RRC_IDLE and/or out of network coverage may camp on a cell and then enter RRC_CONNECTED. In this case, the network may want to configure D2D mode 1 operation for the UE. However, the network may not know whether or not the UE is performing D2D transmission/reception and even how the UE is performing D2D transmission/D2D reception. That is, the network may not know information on D2D transmission/reception of the UE.

In order to solve the problem described above, D2D related information needs to be transmitted to the network upon entering RRC_CONNECTED. Hereinafter, a method for indicating D2D related information according to an embodiment of the present invention is described.

Figure 13:
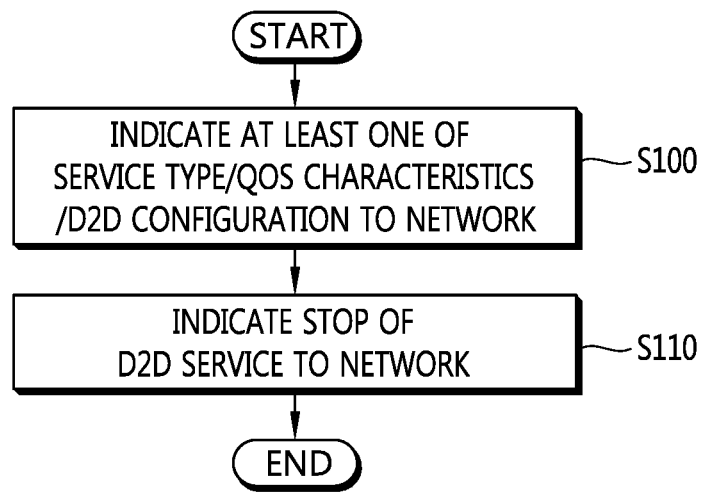
FIG. 13 shows an example of a method for transmitting D2D related information according to an embodiment of the present invention.

FIG. 13 shows an example of a method for transmitting D2D related information according to an embodiment of the present invention.

In step S100, the UE indicates at least one of a service type/quality of service (QoS) characteristics of ongoing/initiated D2D operation or a D2D configuration to the network (i.e. eNB or MME) in RRC_CONNECTED (e.g. upon entering RRC_CONNECTED or upon initiation of D2D service for D2D operation). The service type of the D2D operation may include voice, video, short message, image, etc. The QOS characteristics of the D2D operation may include at least one of delay and bit rate. The D2D configuration may be a configuration used for the D2D operation that the UE performed in RRC_IDLE. The D2D configuration may include D2D mode and D2D scheduling configuration that the UE used for D2D transmission in RRC_IDLE. The D2D scheduling configuration may include interval for D2D transmissions, scheduling period, and timing of scheduling assignment. This indication may be included in a NAS message such as tracking area update message, attach request message, or service request message. In this case, this indication may be transmitted to the MME. Then, the MME may transmit this indication to the eNB via a S1 message. Thereafter, the eNB schedules D2D transmissions or D2D receptions in D2D mode 1, based on this indication (e.g. configuring periodic/semi-persistent scheduling for voice service).

In step S110, the UE indicates stop of the D2D operation to the network. The stop of the D2D operation may be indicated via a MAC CE, RLC control information, PDCP control information, a RRC message, a NAS message, or an application message.

The operation of the UE according to an embodiment of the present invention is described in detail.

1. The UE in RRC_IDLE may configure D2D mode 2 and perform transmission or reception for D2D communication in D2D mode 2. The UE in D2D mode 2 may determine the configuration of PHY/MAC/RLC/PDCP for D2D communication, which may be called D2D configuration, e.g. by its own decisions, by receiving the D2D message from the neighboring UE, by the RRC message such as system information received from the cell, or by default/specified configurations, i.e. configurations specified in 3GPP specifications. In D2D mode 1/2, according to the D2D scheduling configuration, the UE may transmit D2D scheduling assignments indicating multiple D2D resources, and then transmit a transport block in each D2D resource (time/frequency) either until the D2D scheduling validity time expires or from the beginning of the scheduling period and the end of the scheduling period.

2. Upon camping on a cell, the UE receives system information from the cell and check if the UE can initiate RRC connection establishment for D2D communication based on the received system information. For instance, the UE may checks if the UE can initiate RRC connection establishment for D2D communication by performing the D2D specific access barring check based on the D2D specific access barring parameters received via the system information. The D2D specific access barring parameters may include barring factor and barring time. If the UE passes the D2D specific access barring, the RRC layer of the UE initiates RRC connection establishment for D2D communication. Then, the UE enters RRC_CONNECTED. Otherwise, the UE starts the timer with the barring time. While the timer is running, the UE cannot perform RRC connection establishment for D2D communication (or D2D discovery).

3. In RRC_CONNECTED, if the UE is performing or starts to perform transmission or reception for D2D communication, the UE indicates the following information elements to the network (MME or eNB) as the D2D configuration. This indication may be indicated via a MAC CE (such as BSR MAC CE or a new type of MAC CE), RLC control information, PDCP control information, RRC message, NAS message, or application message. Upon entering RRC_CONNECTED, the UE performing D2D transmissions/receptions may transmit a service request message indicating D2D communication or D2D discovery to the MME.

Start of transmission or reception for D2D communication;
Service types for transmission or reception for D2D communication: voice/video/background service which is ongoing or ready to be transmitted or received;
QoS characteristics for transmission and reception for D2D communication: delay and bit rate;
D2D scheduling configuration: The D2D scheduling configuration may include the D2D mode. The D2D mode indicates which mode is used for D2D transmissions in the UE. The D2D mode may be configured for each UE, for each (logical) channel group, or for each (logical) channel. For instance, D2D mode 1 may be configured for a radio bearer of voice service, while D2D mode 2 may be configured for a radio bearer of background service.

The D2D scheduling configuration may further include the D2D TX scheduling configuration (used for the UE to perform D2D transmissions). The D2D TX scheduling configuration may include D2D TX D-RNTI (DRNTI) for D2D transmissions, D2D TX scheduling interval, and either D2D TX scheduling validity time or a length of a D2D TX scheduling period. D-RNTI may defined for the eNB to allocate D2D scheduling assignment to the UE performing D2D communication. Upon D2D scheduling configuration, the UE may consider that one or more D2D transmissions are periodically scheduled every D2D TX scheduling interval until the D2D TX scheduling validity time expires or the end of a D2D TX scheduling period.

Figure 14:
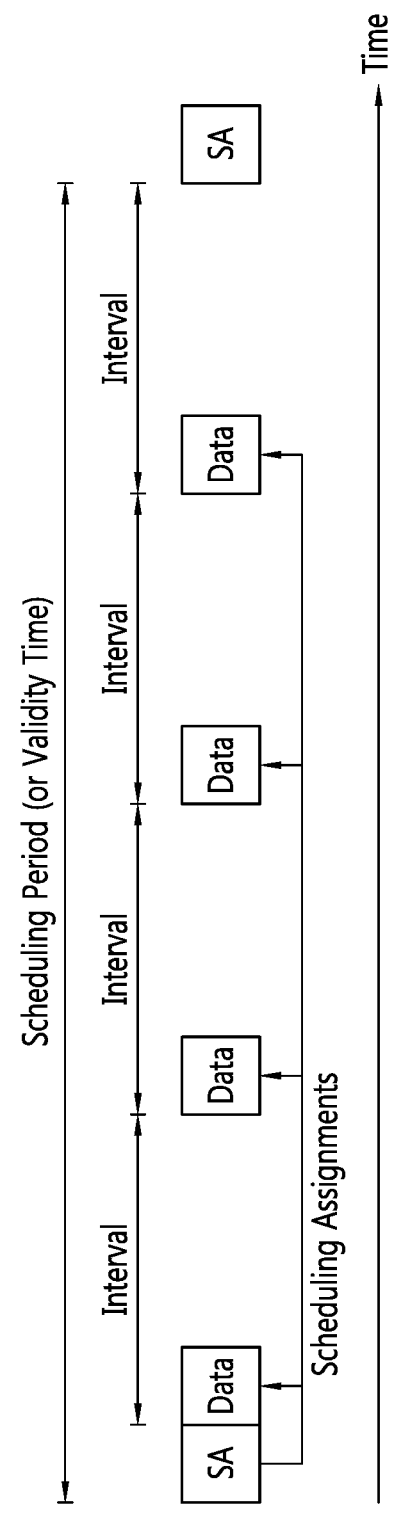
FIG. 14 shows an example of a D2D scheduling configuration and a D2D scheduling assignment.

FIG. 14 shows an example of a D2D scheduling configuration and a D2D scheduling assignment. Referring to FIG. 14, the D2D scheduling configuration configures interval for D2D transmissions, scheduling period (or validity time), and timing of scheduling assignment.

The D2D scheduling configuration may further include the D2D RX scheduling configuration (used for the UE to perform D2D receptions). The D2D RX scheduling configuration may include D2D RX scheduling interval, and either D2D RX scheduling validity time or a length of a D2D RX scheduling period. Upon D2D scheduling configuration, the UE may consider that D2D scheduling receptions are periodically scheduled every D2D RX scheduling until the D2D RX scheduling validity time expires or the end of a D2D RX scheduling period.

Configuration of D2D channels and D2D layer 2. The configuration of D2D channels may include at least one of a physical configuration by the UE (e.g. radio resource configuration by the UE), MAC configuration by the UE, RLC configuration by the UE, PDCP configuration by the UE, the number of D2D logical channels configured by the UE, or information on a group of D2D logical channels (i.e. LCG) configured by the UE.

The number of D2D receiving UEs for D2D transmission performed by this UE;

Maximum or average transmission power for D2D transmission from this UE;

Whether the UE is receiving D2D data or the UE is transmitting D2D data over direct interface with another UE.

4. Based on the D2D configuration received from the UE, RRC layer of the eNB may provide the RRC layer of the UE with another D2D configuration whose information elements may have different values than what the UE indicated in the step 3 above.

5. In RRC_CONNECTED, the UE performing D2D transmissions may report initiation or stop of (public safety) voice service to the eNB. Or, the UE performing D2D transmissions may requests D2D resources relevant for (public safety) voice service. This report and request may be transmitted to the eNB via a MAC CE (such as BSR MAC CE or a new type of MAC CE), RLC control information, PDCP control information, RRC message, NAS message, or application message.

6. Then, the eNB may configure periodic or semi-persistent scheduling for D2D transmissions, so that the eNB will allocate periodic D2D transmission resources to the UE.

7. In RRC_CONNECTED, if the UE stops performing transmission or reception for D2D communication, the UE may indicate the stop of transmission or reception for D2D communication to the network (MME or eNB). This indication may be indicated via a MAC CE (such as BSR MAC CE or a new type of MAC CE), RLC control information, PDCP control information, RRC message, NAS message, or application message.

Figure 15:
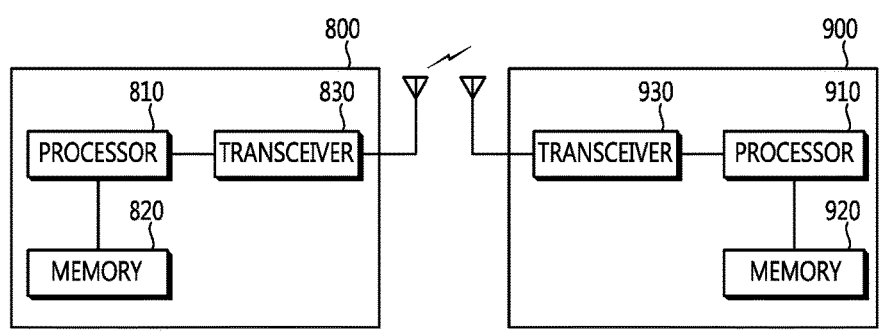
FIG. 15 shows a wireless communication system to implement an embodiment of the present invention.

FIG. 15 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for indicating, by a user equipment (UE), device-to-device (D2D) related information in a wireless communication system, the method comprising:
 performing a D2D operation in a radio resource control (RRC) idle mode; and
 upon entering the RRC connected mode, transmitting, by the UE, the D2D related information of the D2D operation which is performed in the RRC idle mode, wherein the D2D related information includes quality of service (QoS) characteristics of the D2D operation and a D2D configuration of the D2D operation, to a network,
 wherein the QOS characteristics of the D2D operation include at least one of delay and bit rate,
 wherein the D2D configuration of the D2D operation includes a D2D mode and a D2D scheduling configuration, and
 wherein the D2D scheduling configuration comprises an interval for the D2D operation, a scheduling period and a timing of scheduling assignment.

2. The method of claim 1, wherein the QoS characteristics of the D2D operation or the D2D configuration is indicated via a media access control (MAC) control element (CE), radio link control (RLC) control information, packet data convergence protocol (PDCP) control information, a radio resource control (RRC) message, a non-access stratum (NAS) message, or an application message.

3. The method of claim 1, wherein stopping the D2D operation is indicated via a MAC CE, RLC control information, PDCP control information, a RRC message, a NAS message, or an application message.

4. The method of claim 1 further comprising:
indicating a configuration of D2D channels to the network.

5. The method of claim 1 further comprising:
indicating whether the UE performs a D2D operation with another UE to the network.

6. The method of claim 1 further comprising:
transmitting a service request message indicating the D2D operation to a mobility management entity (MME).

7. The method of claim 1 further comprising:
requesting D2D resources for the D2D operation from the network.

8. The method of claim 1, wherein the UE performs the D2D operation in a D2D mode 2, which is related to UE autonomous resource selection, and wherein D2D mode 1 is related to scheduled resource allocation.

9. The method of claim 1 further comprising:
receiving, from the network, a new D2D configuration, which is determined based on the D2D related information.

10. A user equipment (UE) comprising:
a memory;
a transceiver; and
a processor, coupled to the memory and the transceiver, that:
performs a D2D operation in a radio resource control (RRC) idle mode;
enters an RRC connected mode;
upon entering the RRC connected mode, controls the transceiver to transmit the D2D related information of the D2D operation which is performed in the RRC idle mode, wherein the D2D related information includes quality of service (QoS) characteristics of the D2D operation and a D2D configuration to a network,
wherein the QOS characteristics of the D2D operation include at least one of delay and bit rate,
wherein the D2D configuration of the D2D operation includes a D2D mode and a D2D scheduling configuration, and
wherein the D2D scheduling configuration comprises an interval for the D2D operation, a scheduling period and a timing of scheduling assignment.

* * * * *